(12) United States Patent
Rai et al.

(10) Patent No.: US 8,190,488 B2
(45) Date of Patent: May 29, 2012

(54) METHODS AND SYSTEMS FOR EVALUATING THE IMPACT OF CONSOLIDATING PRINT SHOPS ON INVENTORY LEVELS

(75) Inventors: Sudhendu Rai, Fairport, NY (US); Patrick Dennis Regan, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 12/139,679

(22) Filed: Jun. 16, 2008

(65) Prior Publication Data

US 2009/0313061 A1    Dec. 17, 2009

(51) Int. Cl.
G06Q 30/00    (2012.01)
G06G 1/14    (2006.01)
G06Q 20/00    (2012.01)
G06Q 10/00    (2012.01)

(52) U.S. Cl. ..... 705/26.2; 705/22; 705/26.1; 705/26.81; 705/26.9; 705/28

(58) Field of Classification Search .................... 705/22, 705/28

See application file for complete search history.

(56) References Cited

U.S. PATENT DOCUMENTS

| | | | |
|---|---|---|---|
| 6,405,178 B1 * | 6/2002 | Manchala et al. | 705/29 |
| 6,415,277 B1 * | 7/2002 | Klatt et al. | 1/1 |
| 6,535,294 B1 * | 3/2003 | Arledge et al. | 358/1.15 |
| 6,805,502 B2 * | 10/2004 | Rai et al. | 400/61 |
| 7,125,179 B1 * | 10/2006 | Rai et al. | 400/62 |
| 7,139,721 B2 * | 11/2006 | Borders et al. | 705/7.24 |
| 2001/0044868 A1 * | 11/2001 | Roztocil et al. | 710/129 |
| 2002/0161464 A1 * | 10/2002 | Weiner | 700/97 |
| 2002/0188499 A1 * | 12/2002 | Jenkins et al. | 705/10 |
| 2003/0016388 A1 * | 1/2003 | Christodoulou et al. | 358/1.15 |
| 2003/0090722 A1 * | 5/2003 | Eller et al. | 358/1.17 |
| 2003/0139982 A1 * | 7/2003 | Schwartz et al. | 705/28 |
| 2004/0061891 A1 * | 4/2004 | Philpot | 358/1.15 |
| 2004/0103048 A1 * | 5/2004 | Vitulli et al. | 705/28 |
| 2004/0153379 A1 * | 8/2004 | Joyce et al. | 705/28 |
| 2004/0260513 A1 * | 12/2004 | Fitzpatrick et al. | 702/182 |
| 2007/0019233 A1 * | 1/2007 | Rai et al. | 358/1.15 |
| 2009/0043628 A1 * | 2/2009 | Gombert | 705/8 |

* cited by examiner

*Primary Examiner* — Ig T An

(74) *Attorney, Agent, or Firm* — Fox Rothschild LLP

(57) ABSTRACT

In an embodiment, a system of evaluating an impact of consolidating a plurality of print shops on inventory levels may include a processor and a processor-readable storage medium in communication with the processor. The processor-readable storage medium may include one or more programming instructions for performing a method of evaluating an impact of consolidating a plurality of print shops on inventory levels. The method may include identifying a plurality of print shops to consolidate from an enterprise, identifying an inventory policy, receiving corresponding job demand information and determining a plurality of total inventory requirements for the identified print shops. The total inventory requirements may include a total average inventory level and a total order-up-to level. The method may also include determining, a plurality of consolidated inventory requirements for a consolidated print shop and displaying statistics pertaining to the job demand information, the total inventory requirements and the consolidated inventory requirements.

20 Claims, 13 Drawing Sheets

FIG. 3

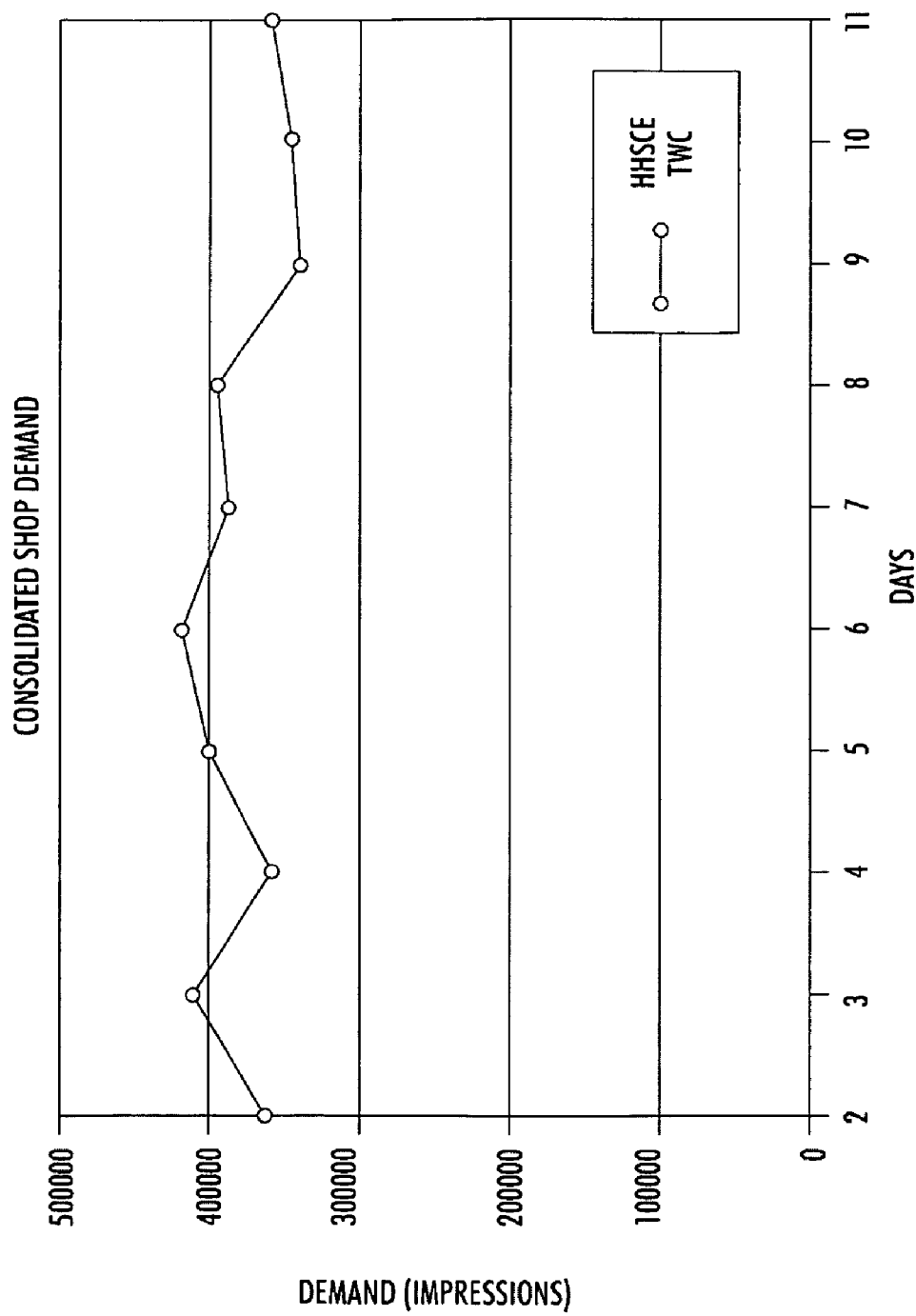

METHODS AND SYSTEMS FOR EVALUATING THE IMPACT OF CONSOLIDATING PRINT SHOPS ON INVENTORY LEVELS

BACKGROUND

It is common for print shops in an enterprise to experience fluctuating job demand. For example, one print shop in an enterprise may be continuously busy, while another print shop in the same enterprise may only be occasionally busy. Due to the variability in job demand, an enterprise must maintain a certain level of inventory, such as ink, paper and the like, in anticipation of the jobs the enterprise will receive. This inventory level is usually significant because the enterprise must maintain an inventory level necessary to process its largest jobs.

By consolidating two or more print shops in an enterprise, it is possible to consolidate the job demand associated with these print shops. Consolidation tends to lower the variation in job demand and therefore reduces the inventory levels that must be maintained by an enterprise.

As such, print shop operators would like to analyze the impact of consolidating a plurality of print shops on inventory levels associated with the enterprise. It would be beneficial for print shop operators to evaluate multiple consolidation options in order to determine whether inventory levels of a print enterprise can be reduced.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system of evaluating an impact of consolidating a plurality of print shops on inventory levels may include a processor and a processor-readable storage medium in communication with the processor. The processor-readable storage medium may include one or more programming instructions for performing a method of evaluating an impact of consolidating a plurality of print shops on inventory levels. The method may include identifying a plurality of print shops to consolidate from an enterprise, identifying an inventory policy, for each identified print shop, receiving corresponding job demand information and determining, by a computing device, a plurality of total inventory requirements for the identified print shops. The total inventory requirements may include a total average inventory level and a total order-up-to level. The method may also include determining, by the computing device, a plurality of consolidated inventory requirements for a consolidated print shop, where the consolidated inventory requirements include a consolidated average inventory level and a consolidated order-up-to level, and displaying, to a user, one or more statistics pertaining to one or more of the job demand information, the total inventory requirements and the consolidated inventory requirements.

In an embodiment, a method of evaluating an impact of consolidating a plurality of print shops on inventory levels may include identifying a plurality of print shops to consolidate from an enterprise, identifying an inventory policy, for each identified print shop, receiving corresponding job demand information and determining, by a computing device, a plurality of total inventory requirements for the identified print shops. The total inventory requirements may include a total average inventory level and a total order-up-to level. The method may also include determining, by the computing device, a plurality of consolidated inventory requirements for a consolidated print shop, where the consolidated inventory requirements include a consolidated average inventory level and a consolidated order-up-to level and displaying to a user one or more statistics pertaining to one or more of the job demand information, the total inventory requirements and the consolidated inventory requirements. In an embodiment, a method of evaluating an impact of consolidating a plurality of print shops on inventory levels may include identifying one or more print shop combinations to consolidate, where each print shop combination includes a plurality of print shops, and identifying an inventory policy. For each identified print shop combination, job demand information may be received from print shops associated with the identified print shop combination. The method may also include determining, by a computing device, a plurality of total inventory requirements for each of the identified print shop combinations, where the total inventory requirements comprise a total average inventory level and a total order-up-to level. A plurality of consolidated inventory requirements may be determined by the computing device for one or more consolidated print shops associated with the identified print shop combinations, where the consolidated inventory requirements may include a consolidated average inventory level and a consolidated order-up-to level. A rank may be assigned to one or more identified print shop combinations. The rank may be based on a percentage by which an inventory level associated with the identified print shop combination is reduced by consolidating the print shops in the identified print shop combination. The rank may be provided to a user.

BRIEF DESCRIPTION OF THE DRAWINGS

FIG. 3 illustrates a screen shot of an exemplary application for identifying print shops to be consolidated according to an embodiment.

FIGS. 7A-7F illustrate consolidation combinations of the print shops according to an embodiments.

DETAILED DESCRIPTION

Figure 1:
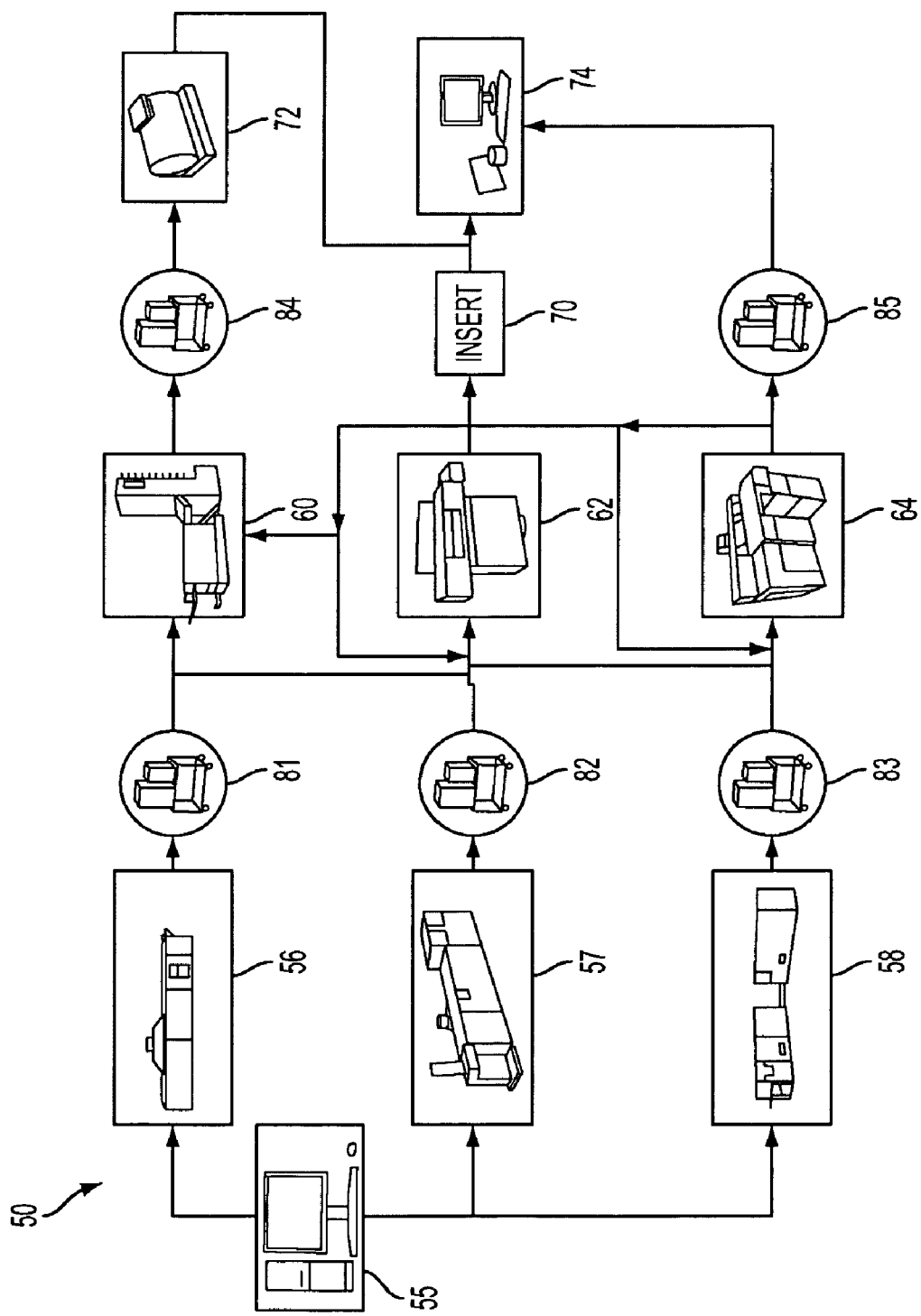
FIG. 1 depicts an exemplary production environment according to an embodiment.

For purposes of the discussion below, a "job" refers to a logical unit of work that is to be completed for a customer. A job may include one or more print jobs from one or more clients.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "resource" is a device that performs a processing function on a job. For example, in a print production environment, a resource may include a printer, a copier, a binder, a hole-punch, a collator, a sealer or any other equipment used to process print jobs.

A "print shop" refers to an entity that includes a plurality of document production resources, such as printers, cutters, collators and the like. A print shop may be a freestanding entity, including one or more print-related devices, or it may be part of a corporation or other entity. Additionally, a print shop may communicate with one or more servers by way of a local area network or a wide area network, such as the Internet, the World Wide Web or the like.

An "enterprise" is a production environment that includes multiple items of equipment to manufacture and/or process jobs that may be customized based on customer requirements. For example, in a print production environment, an enterprise may include a plurality of print shops.

"Consolidating" is the process of combining a plurality of production environments into one unified production environment that is capable of processing the jobs received by each of the combined production environments. For example, a plurality of print shops may be consolidated into one unified print shop that is capable of processing the print jobs received by each of the plurality of print shops.

An "inventory position" is the inventory at a storage location, such as a warehouse, plus any inventory that has been ordered but not yet delivered minus inventory that is backordered.

An "inventory policy" is an analysis of costs, levels, areas of risk and the like associated with a production environment's position.

"Job demand information" is the job volume associated with a production environment over a certain time period. For example, in a print production environment, job demand information may include print job volume associated with a print shop over a certain time period.

An "order-up-to level" is a base-stock inventory level maintained by a production environment. For example, an order-up-to level may represent a certain number of weeks worth of inventory associated with a print shop.

"Print shop inventory information" is data related to inventory levels associated with a print shop. Print shop inventory information may include an average inventory level, an order-up-to level, a coefficient of variation or the like.

"Total inventory requirements" are inventory levels that an enterprise must maintain in order to process the aggregate job demand for the identified production environments. For example, with respect to a print production environment, total inventory requirements may include inventory levels that the enterprise must maintain to process the aggregate print demand for the identified print shops. Total inventory requirements may include a total order-up-to level, a total average inventory level or the like.

A "consolidated production environment" is a unified production environment that is capable of processing the jobs received by a plurality of identified production environments. For example, in a print production environment, a consolidated print shop is a unified print shop that is capable of processing the print jobs received by a plurality of identified print shops.

A "consolidated order-up-to level" is an order-up-to level associated with a consolidated production environment. For example, a consolidated order-up-to level may represent a certain number of weeks worth of inventory associated with a consolidated print shop.

"Consolidated job demand information" is the aggregate job volume associated with the production environments identified for consolidation.

"Consolidated inventory requirements" are inventory levels that a consolidated production environment must maintain in order to process its job demand. Consolidated inventory requirements may include a consolidated average inventory level, a consolidated order-up-to level, a coefficient of variation or the like.

An "inventory reduction percentage" is the percentage by which an inventory level associated with the identified production environments is reduced by consolidating the identified production environments.

A "statistic" is information that may be used in evaluating the impact of consolidating the identified production environments on inventory levels.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

Figure 2:
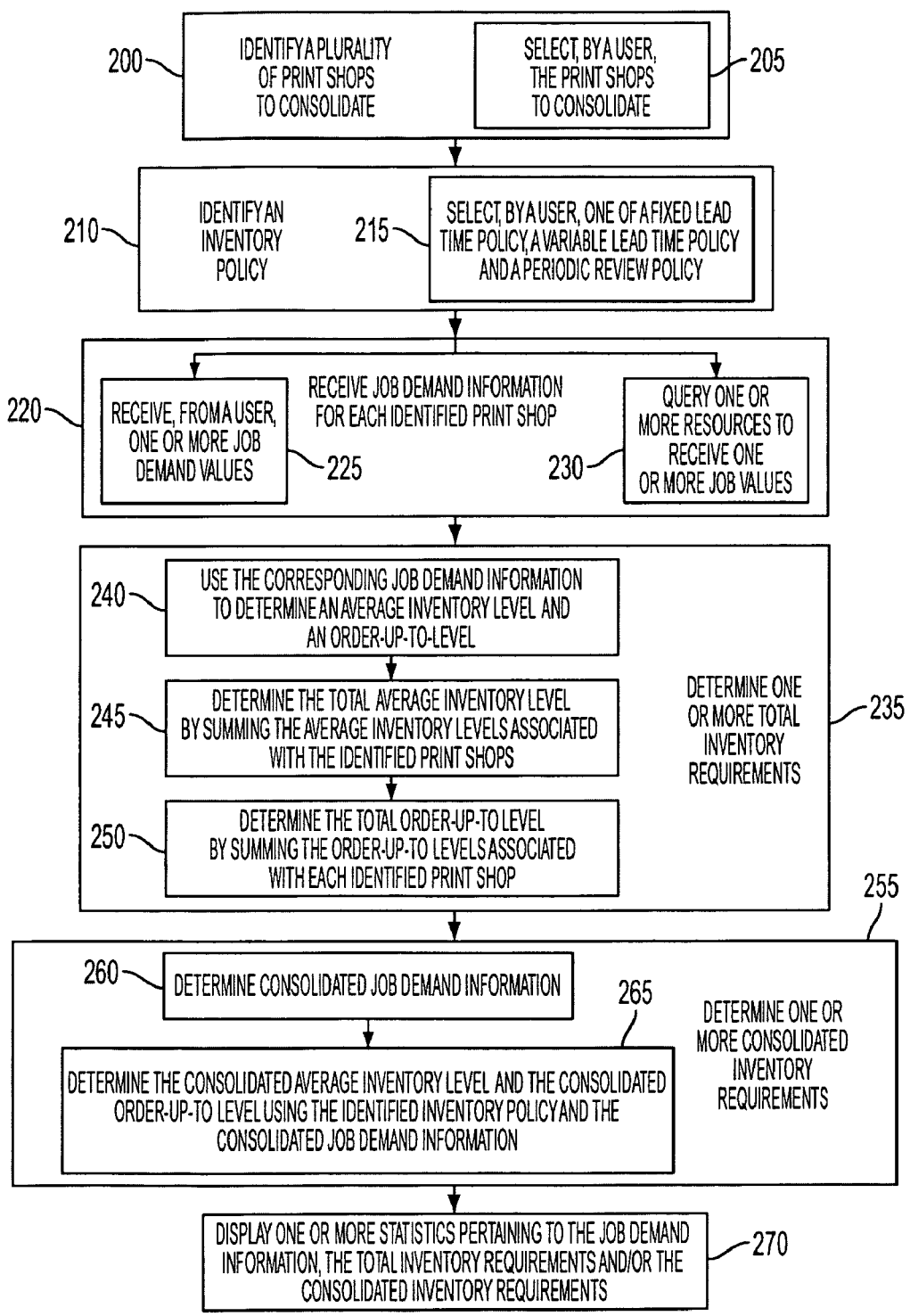
FIG. 2 illustrates a flow chart of an exemplary method of evaluating the impact of consolidating a plurality of print shops on inventory levels according to an embodiment.

FIG. 2 illustrates a flow chart of an exemplary method of evaluating the impact of consolidating a plurality of print shops on inventory positions. An inventory position is the inventory at a storage location, such as a warehouse, plus any inventory that has been ordered but not yet delivered minus inventory that is backordered. For example, if there are 1,500 pages of paper at a warehouse, 1,000 pages awaiting delivery and 500 pages on backorder, the inventory position associated with this print shop is 2,000 pages (i.e., 1,500+1,000−500).

Referring to FIG. 2, a plurality of print shops to consolidate in an enterprise may be identified 200. With respect to a print production environment, consolidating is the process of combining a plurality of print shops into one unified print shop such that the unified print shop is capable of processing the jobs received by each of the plurality of print shops. Consolidating may provide significant advantages such as reduction of inventory levels, an increase in processing efficiency and/or the like. As such, a user may want to evaluate the impact of consolidating a plurality of print shops before actually doing so.

Figure 3:
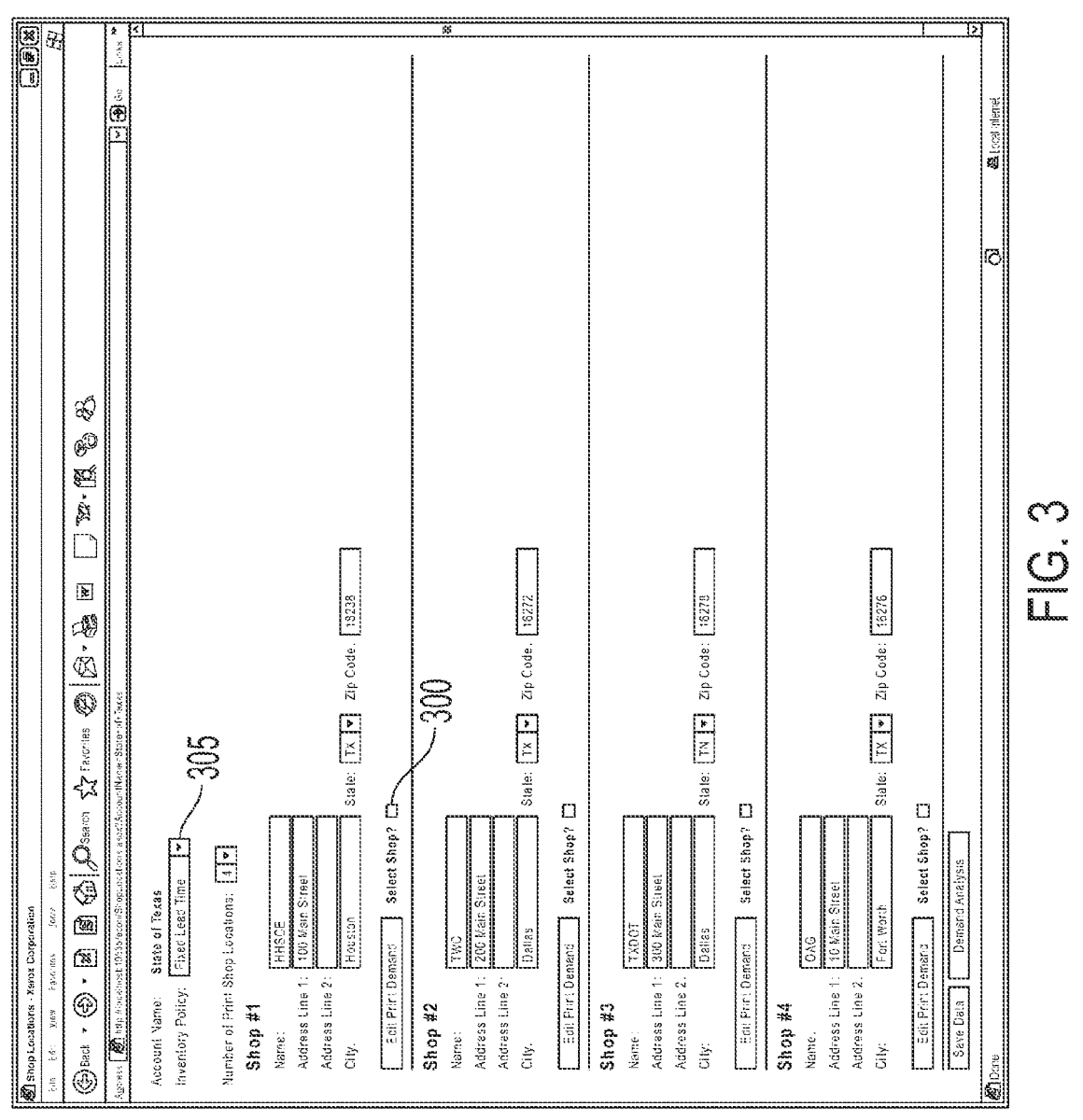

In an embodiment, a user may use a graphical user interface to select 205 shops to consolidate. The user may select a check box, a radio button, a drop down box or the like in the graphical user interface to select the shops to consolidate. For example, as illustrated in FIG. 3, a user may select a check box such as that located next to "Select Shop" 300 to include the print shop in the consolidation. Additional and/or alternate selection methodologies may be used within the scope of this disclosure.

In an embodiment, a user may choose to view all possible print shop consolidation options. For example, if an enterprise includes three print shops, PrintShop1, PrintShop2 and PrintShop3, the user may choose to evaluate the impact of consolidation on every print shop combination, which, in this example, would be:

PrintShop1/PrintShop2;
PrintShop1/PrintShop3;
PrintShop2/PrintShop3, and
PrintShop1/PrintShop2/PrintShop3.

In an embodiment, if an enterprise includes n print shops, consolidating two print shops may be performed in $C_2^n$ ways, consolidating three print shops may be performed in $C_3^n$ ways, and so on. As such, a total of $$\sum_{k=2}^{n} C_k^n$$

consolidation options exist for any enterprise. In an embodiment, the system may determine all combinations of consolidation options, display the impact on inventory levels for each option, and/or provide an ordered list of options. In an embodiment, each consolidated option on the list may have an associated rank based on its inventory reduction percentage. An inventory reduction percentage is the percentage by which an inventory level associated with the identified production environments is reduced by consolidating the identified production environments. For example, referring to the print shop combinations above, consolidating the PrintShop1/PrintShop2 combination may reduce inventory levels by the greatest percentage, and as such, the PrintShop1/PrintShop2 combination may be listed first in the ordered list.

An inventory policy used to evaluate the impact of consolidating a plurality of print shops on inventory levels may be identified 210. An inventory policy is an analysis of costs, levels, areas of risk and the like associated with a production environment's inventory. An inventory policy may evaluate holding costs, replenishment time, shortages and other similar factors to determine one or more inventory levels associated with one or more print shops. In an embodiment, a user may select 215 an inventory policy to use in evaluating the impact of consolidating on inventory levels using a graphical user interface. As illustrated in FIG. 3, a user may select an inventory policy from a drop down list 305. In another embodiment, a user may choose an inventory policy by selecting a check box, a radio button or the like associated with the policy. Additional and/or alternate selection methodologies may be used within the scope of this disclosure. In an alternate embodiment, the inventory policy may be predetermined such that each print shop in an enterprise is associated with an inventory policy. In an embodiment, inventory policies may include a fixed continuous review policy, a variable continuous review policy, a base stock policy and the like.

Figure 4:
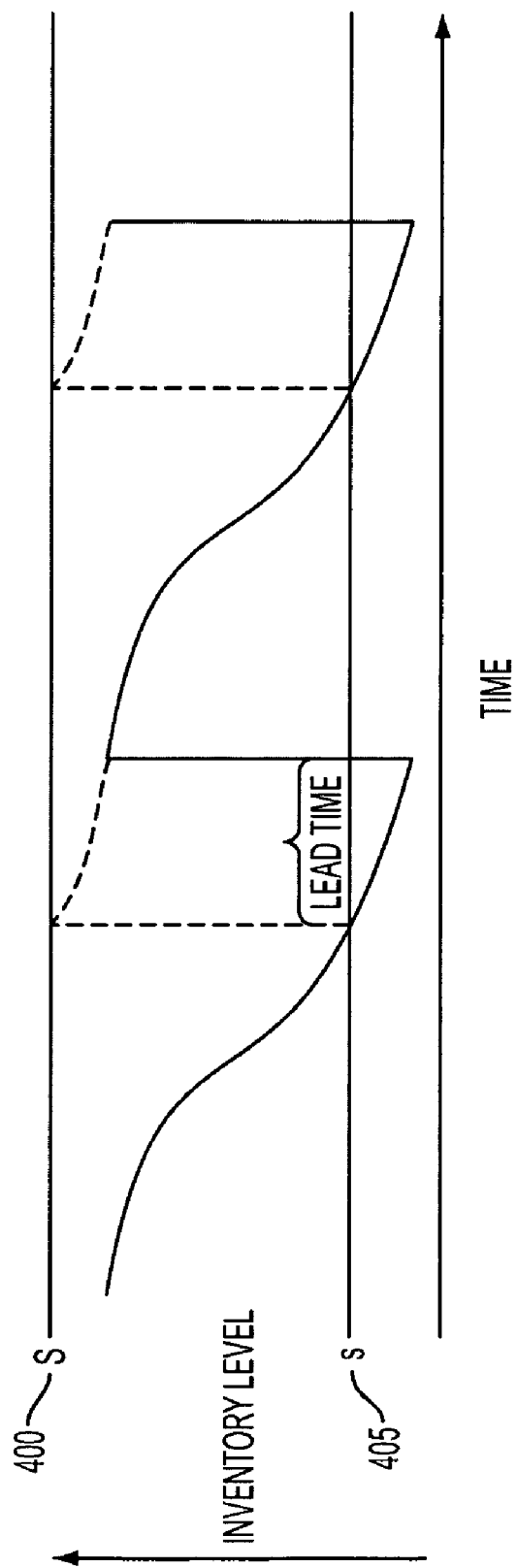
FIG. 4 depicts a graphical representation of an exemplary fixed continuous review inventory policy according to an embodiment.

A fixed continuous review policy continuously monitors the amount of inventory in a production environment and orders a fixed amount of inventory each time an inventory position drops below a specified value. In FIG. 4, the order-up-to level, 'S' 400, represents the maximum level of inventory and the reorder point, 's' 405, represents an inventory threshold value. When an inventory position falls below 's', an order represented by the amount 'S'–'s' may be placed. For example, 'S' may equal 20,000 pages and 's' may equal 5,000 pages. If the inventory position reaches 4,999 pages, 15,000 pages (i.e., 'S'–'s') may be ordered.

Order-up-to levels and average inventory levels may be determined using one or more parameter values such as lead time ("L"), average daily demand ("AVG"), standard deviation of daily demand ("STD"), inventory holding cost per unit produced per day ("h"), the fixed cost associated with each inventory order ("K") and the like. Lead time may refer to the inventory replenishment time from a supplier in days. A safety factor ("z") may also be used. A safety factor may be chosen from one or more statistical tables so that the probability of stock-outs during the lead time period is 1−α. Assuming that the demand follows a normal distribution, Table 1 may illustrate the relationship between z and α according to an embodiment.

TABLE 1

Relationship between α and z

| | α | | | | | | | | | | |
|---|---|---|---|---|---|---|---|---|---|---|---|
| | 90% | 91% | 92% | 93% | 94% | 95% | 96% | 97% | 98% | 99% | 99.9% |
| z | 1.29 | 1.34 | 1.41 | 1.48 | 1.56 | 1.65 | 1.75 | 1.88 | 2.05 | 2.33 | 3.08 |

As such, 's' may satisfy the following:

$$\text{Probability } \{\text{demand during lead time} \geq s\} = 1 - \alpha.$$

For example, an α of 0.999 implies that stock-outs do not occur more than 0.001% of the time. In other words, the cumulative demand during the lead time may be less than 's' for 99.9% of the time to prevent stock-outs. If the demand follows a normal distribution, a lookup table may used to determine a safety factor value of z=3.08 that corresponds to α=0.0999.

Based on these parameters, the order-up-to level, 'S', may be determined by:

$$S = \sqrt{\frac{2K*AVG}{h}} + z*STD*\sqrt{L}.$$

Similarly, the average inventory level may be determined by:

$$AverageInventoryLevel = \sqrt{\frac{K*AVG}{2h}} + z*STD*\sqrt{L}.$$

In another embodiment, a variable continuous review order policy may be used to determine order-up-to and average inventory levels. In such an embodiment, the lead time may be variable rather than being fixed. For example, inventory may be replenished after a first stock-out in two days, after a second stock-out in two and a half days, after a third stock-out in one day, and so on. As such, additional parameters associated with this order policy may include average lead time ("AVGL") and standard deviation of lead time ("STDL").

An average inventory level may be determined by:

AverageInventoryLevel=AVG*AVGL+z*
$\sqrt{AVGL*STD^2+AVG^2*STDL^2}$

An order-up-to level may be determined by:

$$S = \sqrt{\frac{2K*AVG}{h}} + AVG*AVGL + z*\sqrt{AVGL*STD^2 + AVG^2*STDL^2}$$

In another embodiment, a base stock order policy may be used to determine order-up-to and average inventory levels. A base stock order policy may periodically review and replenish inventory to a base stock level. The inventory may be reviewed at periodic intervals, such as every five days, and compared with a specified base stock level. The difference between the base stock level of inventory and the current inventory may then be ordered. As such, additional parameters associated with this order policy may include the length of the review period ("r").

Figure 5:
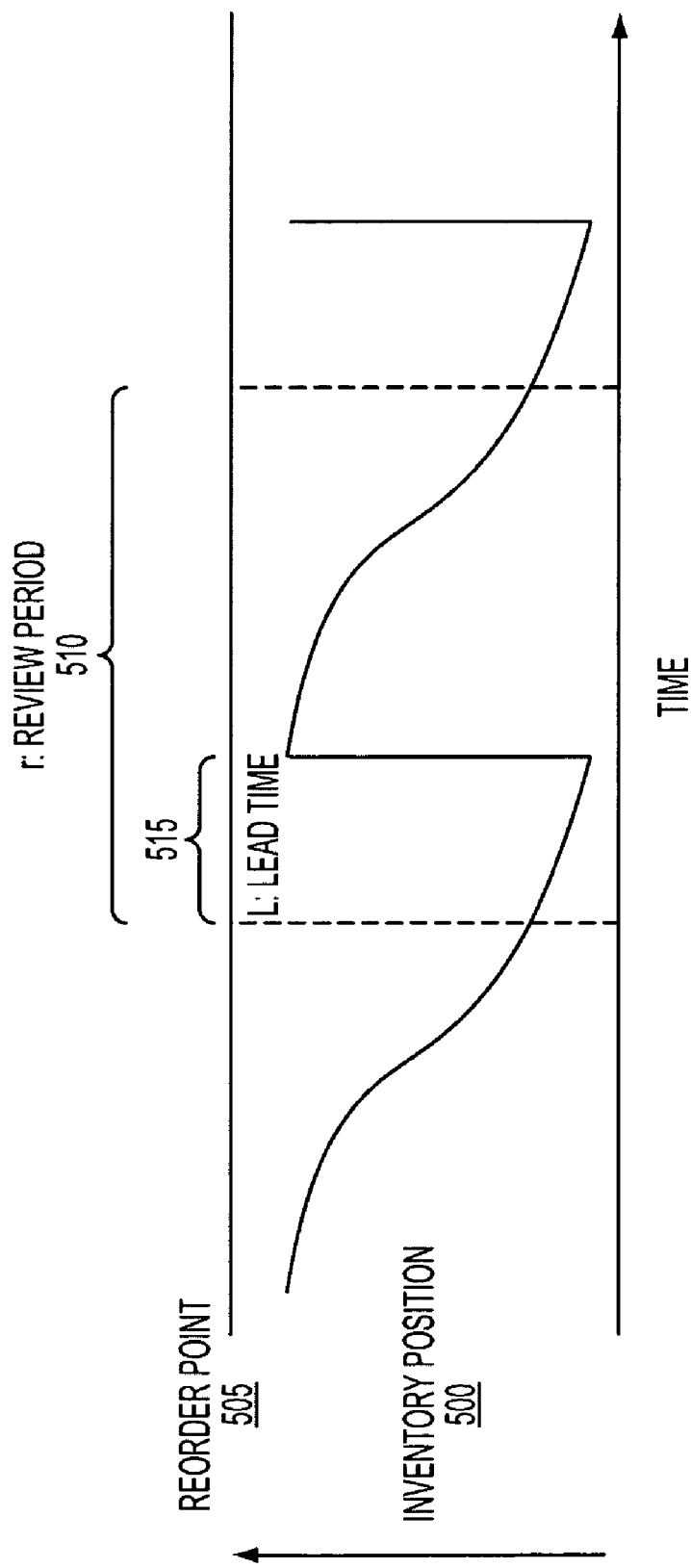
FIG. 5 depicts a graphical representation of an exemplary base stock level inventory policy according to an embodiment.

FIG. 5 illustrates a graphical representation of the base stock level policy. If the inventory position 500 falls below a reorder point 505 during the review period 510, an order may be placed and the inventory may be replenished after the lead time 515.

In an embodiment, a order-up-to level, 'S', determined using a base stock policy may be represented by:

S=r*AVG+z*STD*$\sqrt{r+L}$

In an embodiment, an average inventory level determined using a base stock level policy may be represented by:

$$AverageInventoryLevel = \frac{r*AVG}{2} + z*STD*\sqrt{r+L}$$

Referring back to FIG. 2, job demand information may be received 220 for each identified print shop. Job demand information is the job volume associated with a production environment over a certain time period. For example, job demand information may be the number of pages processed by a print shop per day. Table 2 illustrates the volume per day for two print shops, PrintShop1 and PrintShop2, over a four day period.

TABLE 2

| Day | PrintShop1 Demand | PrintShop2 Demand |
|---|---|---|
| 1 | 185 | 102 |
| 2 | 326 | 417 |
| 3 | 43 | 21 |
| 4 | 201 | 219 |

In an embodiment, job demand information may be automatically received from the identified print shops. In such an embodiment, the system may query 230 one or more resources located at the identified print shops. A resource is a device that performs a processing function on a job. For example, in a print production environment, a resource may include a printer, a copier, a binder, a hole-punch, a collator, a sealer or any other equipment used to process print jobs. Job demand information may be received by the system from one or more resources located at one or more print shops. The job demand information may be used to determine inventory information associated with an identified print shop. In an embodiment, job demand information may be received 225 from a user. The job demand information may include job demand values such as a print volume per day or the like.

In an embodiment, print shop inventory information may be determined for each identified print shop using an inventory policy and the job demand information associated with the print shop. Print shop inventory information is data related to inventory levels associated with a print shop. Print shop inventory information may include an average inventory level, an order-up-to level, a coefficient of variation or the like. A coefficient of variation represents demand variation and may be determined by dividing the standard deviation of volume by the mean in volume for a certain print shop.

Referring back to Table 2, print shop inventory information may be determined for PrintShop1 and PrintShop2. For example, a user may select a fixed continuous review policy, and the parameters associated with this inventory policy may have the following values:

L=1 day
AVG=188.75
STD=115.82
h=$0.000001
K=$50.00
z=3

The order-up-to level associated with PrintShop1 may be determined by:

$$S = \sqrt{\frac{2K*AVG}{h}} + z*STD*\sqrt{L} = 137,734$$

The average inventory level associated with Print Shop 1 may be determined by:

$$AverageInventoryLevel = \sqrt{\frac{K*AVG}{2h}} + z*STD\sqrt{L} = 68,693$$

In other words, PrintShop1 may maintain an order-up-to level of inventory (in this case paper) of 137,734 pages and an average inventory level of 68,693 pages in order to process the volume of lobs listed in Table 1.

For PrintShop2, the parameters associated with the fixed continuous review policy may have the following values:

L=1 day
AVG=189.75
STD=171.93
h=$0.000001
K=$50.00
z=3

The order-up-to level associated with PrintShop2 may be determined by:

$$S = \sqrt{\frac{2K*AVG}{h}} + z*STD*\sqrt{L} = 138,266$$

The average inventory level associated with PrintShop2 may be determined by;

$$AverageInventoryLevel = \sqrt{\frac{K*AVG}{2h}} + z*STD\sqrt{L} = 66,077$$

In other words, PrintShop2 may maintain an order-up-to level (in this case paper) of 138,266 pages and an average inventory level of 66,077 pages in order to process the volume of jobs listed in Table 2.

Total inventory requirements are determined 235 for the identified print shops. Total inventory requirements are inventory levels that an enterprise must maintain in order to process the aggregate job demand for the identified print shops. Total inventory requirements may include a total order-up-to levels a total average inventory level or the like.

For example, referring to Table 2, the total inventory requirements for PrintShop1 and PrintShop2 may be determined for comparison purposes. In an embodiment, the corresponding job demand information may be used 240 to determine an average inventory level and an order-up-to level for each identified print shop. In an embodiment, the total inventory requirements may be determined by summing 245, 250 the inventory information associated with the print shops. For example, as illustrated by Table 3, the total order-up-to level for the print shops may be determined by summing the order-up-to levels for PrintShop1 and PrintShop2 (i.e., 137,734+138,266=275,999). Similarly, the total average inventory level for the print shops may be determined by summing the average inventory levels for PrintShop1 and PrintShop2 (i.e., 68,693+66,077=134,770).

TABLE 3

|  | Average Inventory Level | Order-Up-To Level |
| --- | --- | --- |
| PrintShop1 | 68,693 | 137,734 |
| PrintShop2 | 66,077 | 138,266 |
| Totals | 134,770 | 275,999 |

Consolidated job demand information may be determined 260 for a consolidated production environment, such as a consolidated print shop. A consolidated print shop is a unified print shop that is capable of processing the print jobs received by each of the identified print shops. Consolidated job demand information is the aggregate job volume over a time period that is associated with the production environments identified for consolidation. Consolidated job demand information may be determined by summing the job demand information of the print shops to be consolidated. Table 4 illustrates the consolidated job demand information associated with consolidating PrintShop1 and PrintShop2. For example, on Day 1, the consolidated demand (i.e., 287) is the sum of the Day 1 demand for PrintShop1 (i.e., 185) and the Day 1 demand for PrintShop2 (i.e., 102).

TABLE 4

| Day | PrintShop1 Demand | PrintShop2 Demand | Consolidated Demand |
| --- | --- | --- | --- |
| 1 | 185 | 102 | 287 |
| 2 | 326 | 417 | 743 |
| 3 | 43 | 21 | 64 |
| 4 | 201 | 219 | 420 |

Consolidated inventory requirements are determined 255 using inventory information corresponding to the identified print shops that a user wants to evaluate. Consolidated inventory requirements are inventory levels that a consolidated production environment must maintain in order to process its job demand. Consolidated inventory requirements may include a consolidated average inventory level, a consolidated order-up-to level, a coefficient of variation or the like, and may be determined using an inventory policy such as those previously discussed. For example, using 265 a fixed continuous review policy and the consolidated job demand information from Table 4, the associated parameters may have the following values:

L=1 day
AVG=378.5
STD=283.94
h=$0.000001
K=$50.00
z=3

The order-up-to level associated with the consolidated print shop may be determined by:

$$S = \sqrt{\frac{2K*AVG}{h}} + z*STD*\sqrt{L} = 195,403.$$

The average inventory level associated with the consolidated print shop may be determined by:

$$AverageInventoryLevel = \sqrt{\frac{K*AVG}{2h}} + z*STD\sqrt{L} = 98,128.$$

In other words, the consolidated print shop may maintain an order-up-to level of inventory (in this case, paper) of 195,403 pages and an average inventory level of 98,128 pages. As such, the order-up-to level for the consolidated shop is approximately 29% less than that of PrintShop1 and PrintShop2 when not consolidated. In addition, the average inventory level for the consolidated shop is approximately 27% less than the unconsolidated shops.

One or more statistics pertaining to one or more of the job demand information, the total inventory requirements and the consolidated inventory requirements is displayed 270 to a user. A statistic is a summary of information that may be used in evaluating the impact of consolidating the identified production environments on inventory levels.

Figure 6:
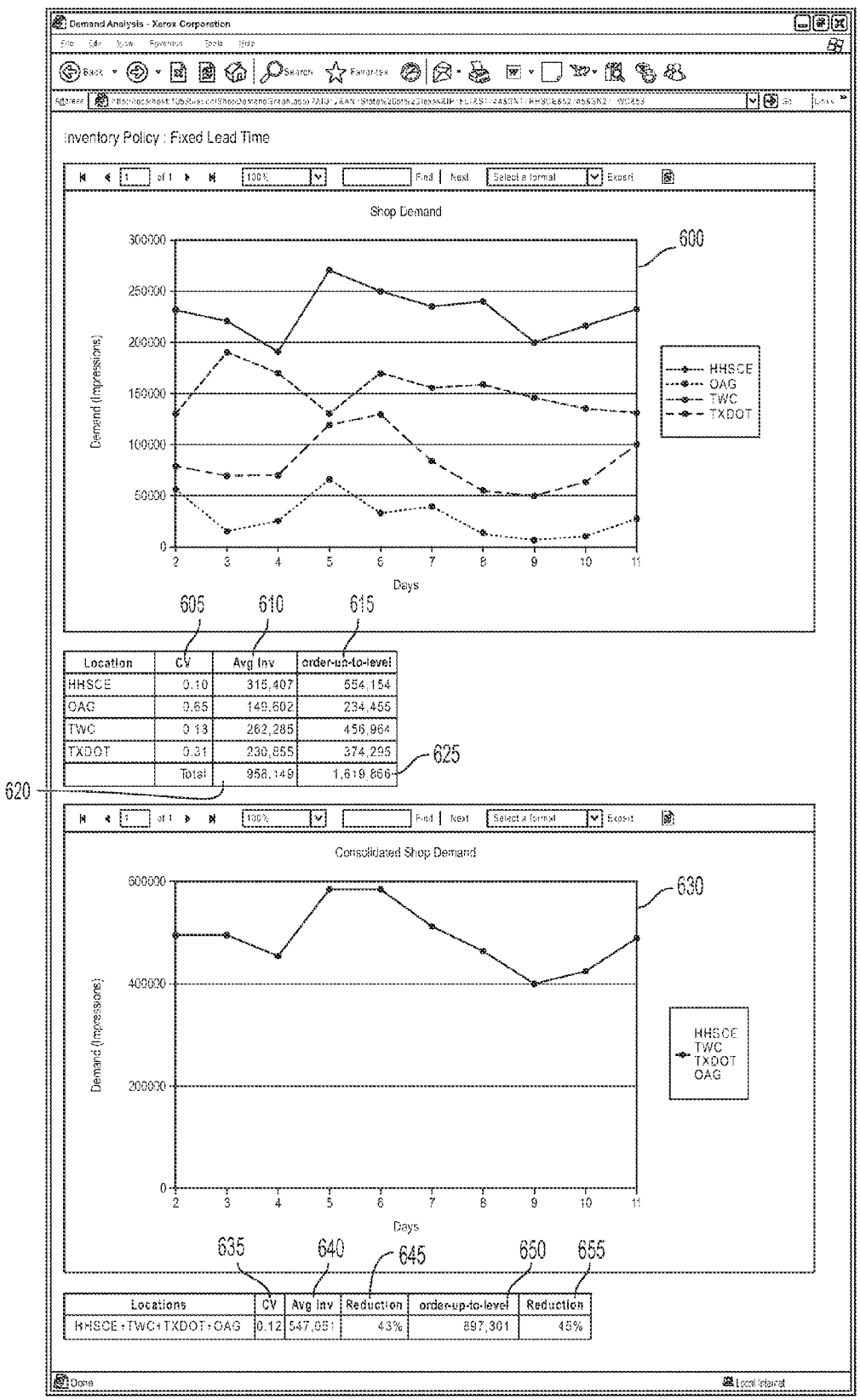
FIG. 6 depicts a statistical analysis pertaining to the consolidation of exemplary print shops according to an embodiment.
Figure 7B:
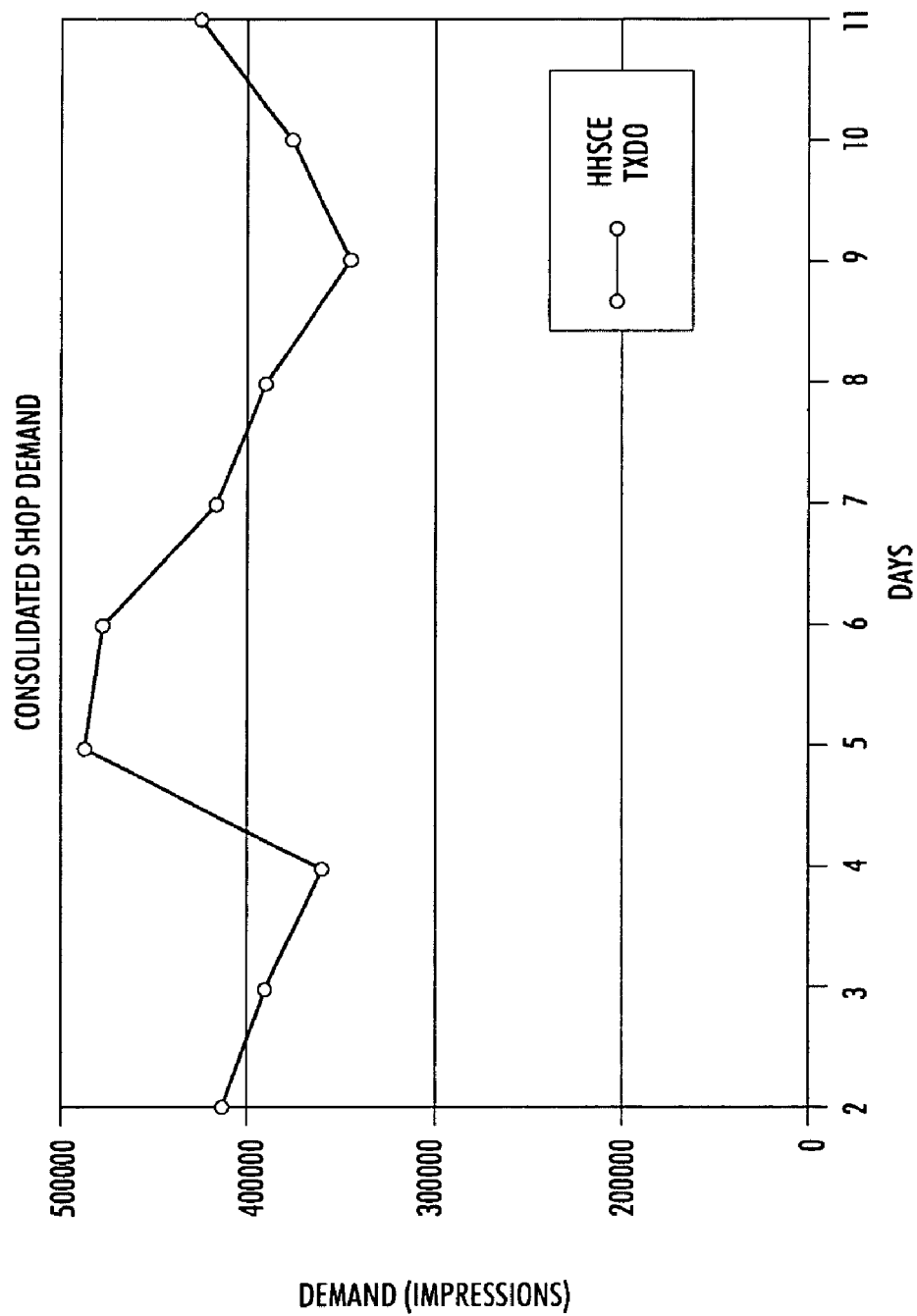
Figure 7C:
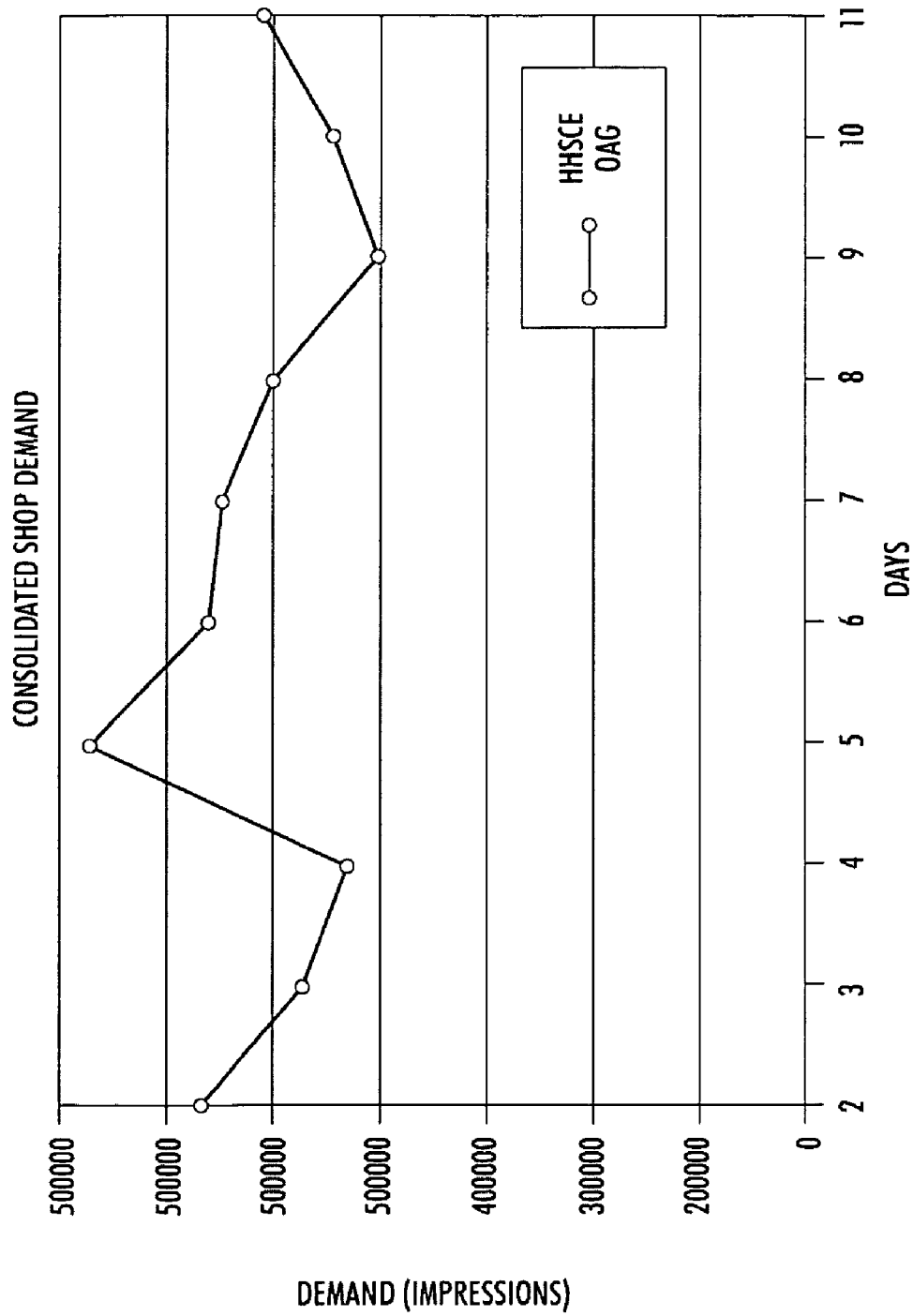
Figure 7D:
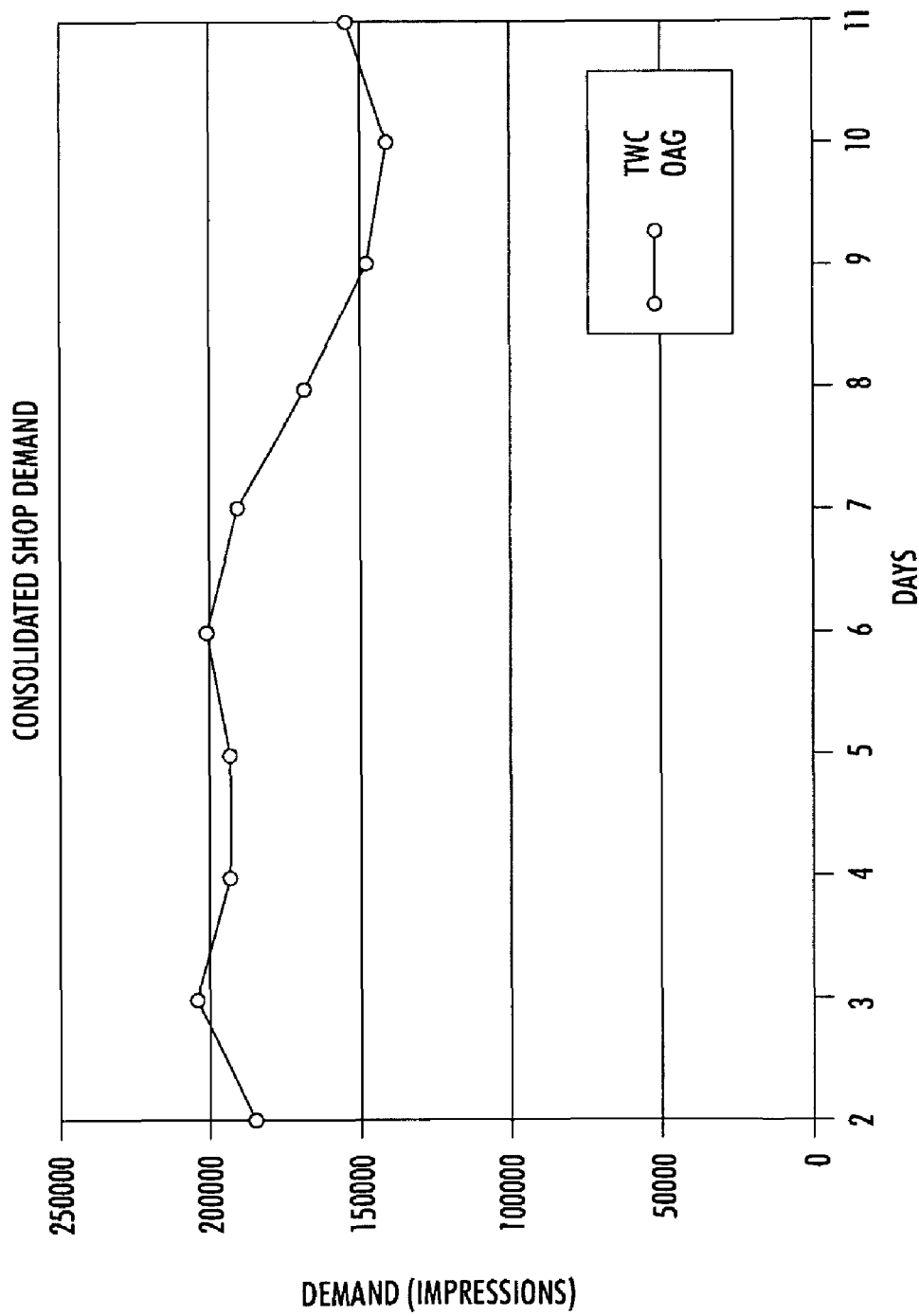
Figure 7E:
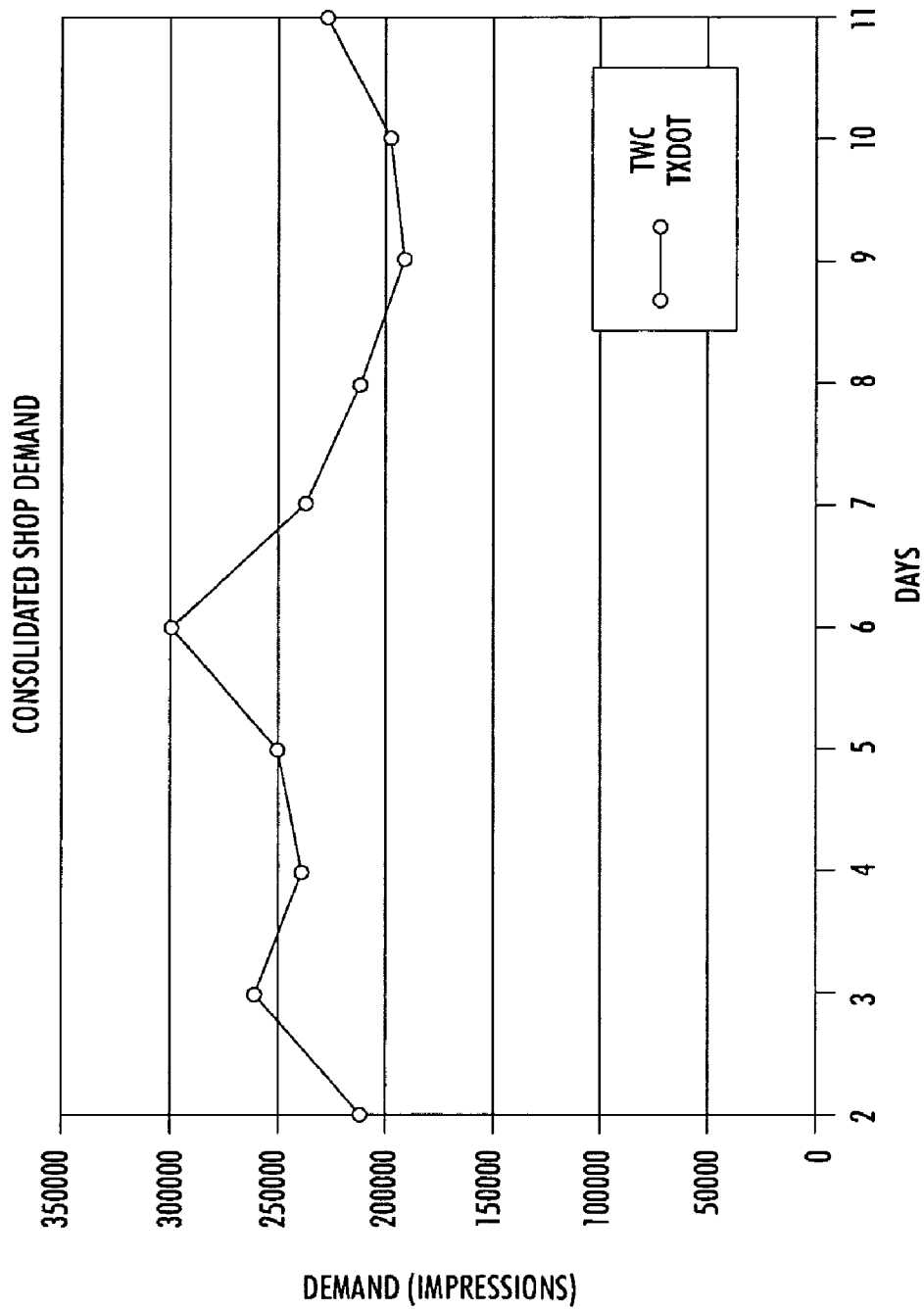
Figure 7F:
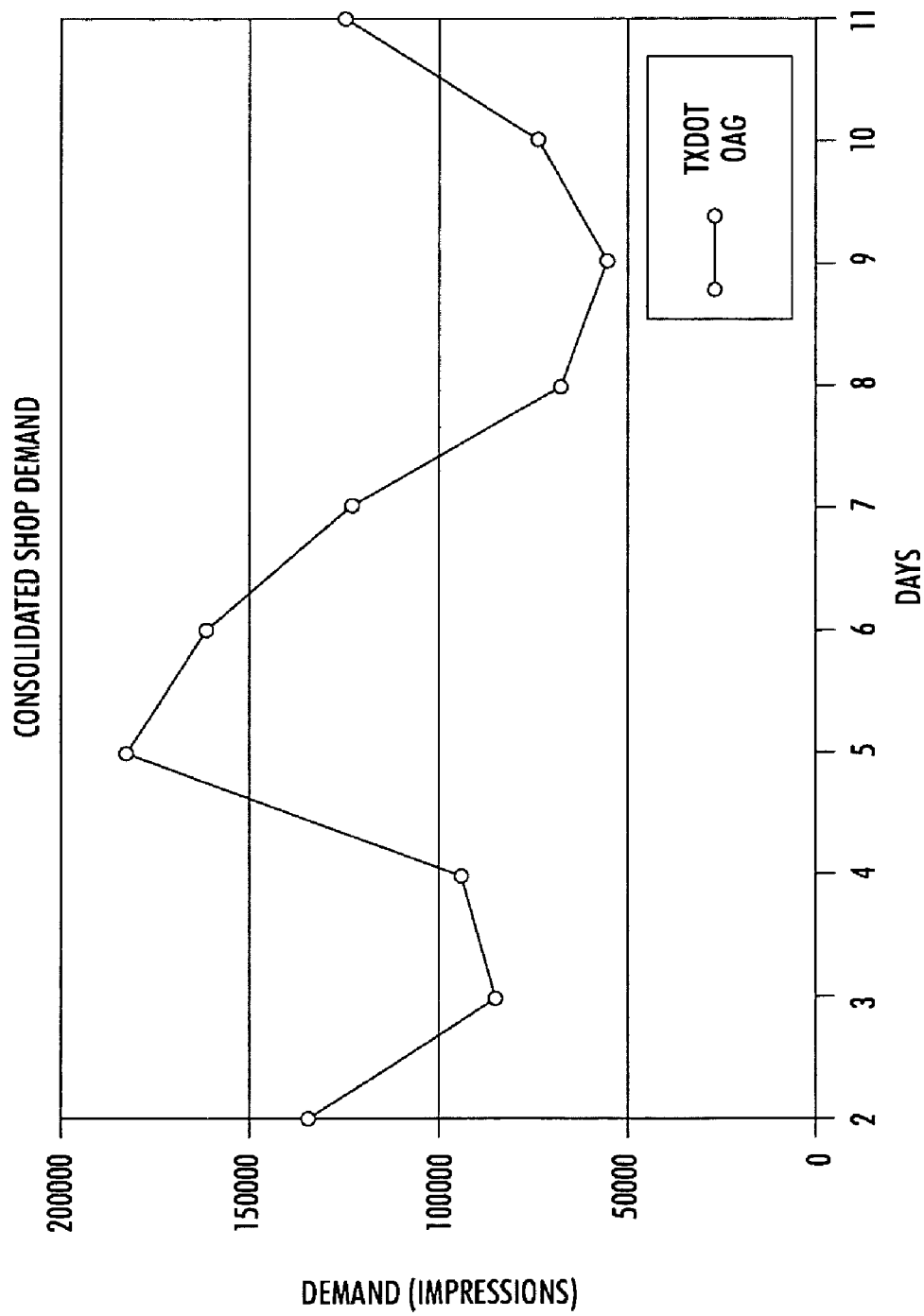

In an embodiment, the statistic may include a comparison of the inventory levels of the identified print shops to the inventory levels associated with the consolidated print shop. In an embodiment, the statistic may include one or more of a graph of the job demand information for one or more identified print shops, a graph of the consolidated job demand information, the average inventory level for one or more identified print shops, the order-up-to level for one or more identified print shops, the total average inventory level, the total order-up-to level, the consolidated average inventory level, the consolidated order-up-to level or the like may be displayed. For example, FIG. 6 depicts an exemplary graph 600 illustrating the job demand information for each identified shop (i.e., shops PrintShop1, PrintShop2, PrintShop3, PrintShop4) and an exemplary chart listing the coefficients of variation 605, the average inventory levels 610 and the order-up-to levels 615 associated with each identified print shop. The chart also lists the total average inventory level 620 and the total order-up-to level 625 for the selected shops.

FIG. 6 also depicts an exemplary graph 630 illustrating job demand information for a consolidated shop, comprising the selected shops, and an exemplary chart listing the coefficient of variation 635, the average inventory level 640, the order-up-to level 650 and inventory reduction percentages 645, 655. An inventory reduction percentage is the percentage by which an inventory level associated with the identified print shops is reduced by consolidating the identified print shops. An inventory reduction percentage may be determined for an order-up-to level, an average inventory level or the like. In an embodiment, the reduction in average inventory level may be determined by dividing the difference between the total average inventory level and consolidated average inventory level by the total average inventory level. Similarly, the reduction in maximum inventory level may be determined by dividing the difference between the total order-up-to level and the consolidated order-up-to level by the total order-up-to level.

In an embodiment, if a user chooses to view all combinations of consolidation options, the impact on inventory levels for each option may be displayed as discussed above, and each consolidation option may be ranked based on the reduction in average inventory level, the reduction in order-up-to level, a combination of the reduction in average inventory level and the reduction in order-up-to level or the like. For example, FIGS. 7A-7F illustrate exemplary consolidation combinations of the print shops described by FIG. 6. FIGS. 7A-7F depict exemplary graphs illustrating job demand information for each consolidated shop combination and exemplary charts listing the coefficient of variation, the average inventory level, the order-up-to level and inventory reduction percentages associated with each combination. Additional and/or alternate display methodologies may be used within the scope of this disclosure.

Figure 8:
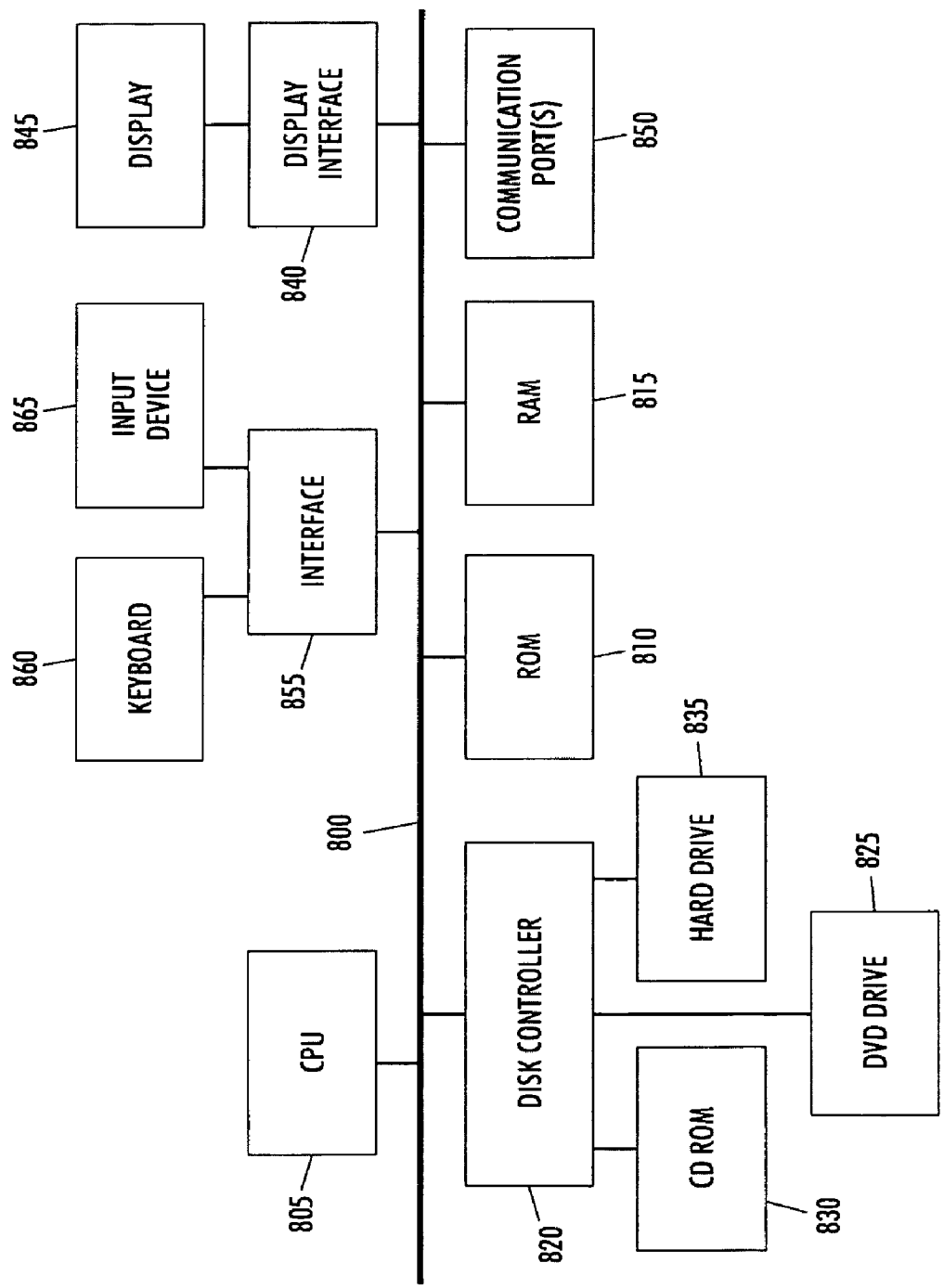
FIG. 8 depicts a block diagram of exemplary internal hardware that may be used to contain or implement the program instructions according to an embodiment.

FIG. 8 depicts a block diagram of exemplary internal hardware that may be used to contain or implement the program instructions according to an embodiment. A bus 800 serves as the main information highway interconnecting the other illustrated components of the hardware. CPU 805 is the central processing unit of the system, performing calculations and logic operations required to execute a program. Read only memory (ROM) 810 and random access memory (RAM) 815 constitute exemplary memory devices.

A disk controller 820 interfaces with one or more optional disk drives to the system bus 800. These disk drives may include, for example, external or internal DVD drives 825, CD ROM drives 830 or hard drives 835. As indicated previously, these various disk drives and disk controllers are optional devices.

Program instructions may be stored in the ROM 810 and/or the RAM 815. Optionally, program instructions may be stored on a tangible computer readable medium such as a compact disk or a digital disk or other recording medium.

An optional display interface 840 may permit information from the bus 800 to be displayed on the display 845 in audio, graphic or alphanumeric format. Communication with external devices may occur using various communication ports 850. An exemplary communication port 850 may be attached to a communications network, such as the Internet or an intranet.

In addition to the standard computer-type components, the hardware may also include an interface 855 which allows for receipt of data from input devices such as a keyboard 860 or other input device 865 such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

In an embodiment, one or more statistics may be displayed via a graphical interface, such as display interface 840.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of evaluating an impact of consolidating a plurality of print shops on inventory levels comprising:
   a processor; and
   a processor-readable storage medium in communication with the processor, wherein the processor-readable storage medium contains one or more programming instructions for performing a method of evaluating an impact of consolidating a plurality of print shops on inventory levels, the method comprising:
      identifying a plurality of print shops from an enterprise to consolidate into a consolidated print shop, wherein each of the plurality of print shops is a unique document production entity,
      identifying an inventory policy for each identified print shop,
      for each identified print shop, receiving corresponding job demand information,
      determining a total inventory requirement for each of the identified print shops, wherein the total inventory requirement for each identified print shop comprises a total average inventory level and a total order-up-to level associated with the identified print shop,
      determining a plurality of consolidated inventory requirements for the consolidated print shop, wherein the consolidated print shop is a unified print shop that is capable of processing all print jobs received by the identified plurality of print shops and the consolidated inventory requirements comprise a consolidated average inventory level and a consolidated order-up-to level,
      determining a plurality of consolidation combinations for the plurality of print shops to consolidate, wherein each of the plurality of consolidation combinations defines two or more of the plurality of print shops to consolidate and includes an inventory reduction percentage associated with the combination of the two or more of the plurality of print shops to consolidate,
      assigning a rank to each of the plurality of consolidation combinations, the rank determined based upon a comparison of the inventory reduction percentage for each of the plurality of consolidation combinations and the consolidated inventory requirements, and displaying, to a user, an ordered list including each of the plurality of consolidation combinations ordered by assigned rank, one or more statistics pertaining to one or more of the job demand information, the total inventory requirements and the consolidated inventory requirements.

2. The system of claim 1, wherein the one or more programming instructions for identifying a plurality of print shops comprises one or more programming instructions for:
    selecting, by a user, the plurality of print shops to consolidate.

3. The system of claim 1, wherein the one or more programming instructions for identifying an inventory policy comprises one or more programming instructions for:
    selecting, by a user, one of a fixed lead time policy, a variable lead time policy and a period review policy as the inventory policy.

4. The system of claim 1, wherein the one or more programming instructions for receiving corresponding job demand information comprises one or more programming instructions for:
    receiving, from a user, one or more job demand values, wherein each job demand value comprises a print volume per day.

5. The system of claim 1, wherein the one or more programming instructions for receiving corresponding job demand information comprises one or more programming instructions for:
    querying one or more resources in the identified plurality of print shops; and
    receiving, from the one or more resources, one or more job demand values, wherein each job demand value comprises a print volume per day.

6. The system of claim 1, wherein the one or more programming instructions for determining a plurality of total inventory requirements comprises one or more programming instructions for:
    for each identified print shop, using the corresponding job demand information to determine an average inventory level and an order-up-to level;
    determining the total average inventory level by summing the average inventory levels associated with each identified print shop; and
    determining the total order-up-to level by summing the order-up-to levels associated with each identified print shop.

7. The system of claim 1, wherein the one or more programming instructions for determining a plurality of consolidated inventory requirements comprises one or more programming instructions for:
    determining consolidated job demand information by summing the job demand information for each selected print shop; and
    using the identified inventory policy and the consolidated job demand information to determine the consolidated average inventory level and the consolidated order-up-to level.

8. The system of claim 1, wherein the one or more programming instructions for displaying one or more statistics comprises one or more programming instructions for displaying one or more of the following:
    a graph of the job demand information for one or more identified print shops;
    a graph of consolidated job demand information;
    an average inventory level for one or more of the identified print shops;
    an order-up-to level for one or more of the identified print shops;
    the total average inventory level;
    the total order-up-to level;
    the consolidated average inventory level;
    the consolidated order-up-to level; and
    an inventory reduction percentage representing a change in an inventory level due to consolidating the identified print shops.

9. A method of evaluating an impact of consolidating a plurality of print shops on inventory levels, the method comprising:
    identifying, by a processing device operably connected to a processor-readable storage medium containing one or more programming instructions for causing the processor to perform a plurality of functions, a plurality of print shops from an enterprise to consolidate into a consolidated print shop, wherein each of the plurality of print shops is a unique document production entity;
    identifying, by the processing device, an inventory policy for each identified print shop;
    for each identified print shop, receiving, by the processing device, corresponding job demand information;
    determining, by the processing device, a total inventory requirement for each of the identified print shops, wherein the total inventory requirement for each identified print shop comprises a total average inventory level and a total order-up-to level associated with the identified print shop;
    determining, by the processing device, a plurality of consolidated inventory requirements for the consolidated print shop, wherein the consolidated print shop is a unified print shop that is capable of processing all print jobs received by the identified plurality of print shops and the consolidated inventory requirements comprise a consolidated average inventory level and a consolidated order-up-to level;
    determining, by the processing device, a plurality of consolidation combinations for the plurality of print shops to consolidate, wherein each of the plurality of consolidation combinations defines two or more of the plurality of print shops to consolidate and includes an inventory reduction percentage associated with the combination of the two or more of the plurality of print shops to consolidate;
    assigning, by the processing device, a rank to each of the plurality of consolidation combinations, the rank determined based upon a comparison of the inventory reduction percentage for each of the plurality of consolidation combinations and the consolidated inventory requirements; and
    displaying, to a user by a display device operably connected to the processing device, an ordered list including each of the plurality of consolidation combinations ordered by assigned rank, one or more statistics pertaining to one or more of the job demand information, the total inventory requirements and the consolidated inventory requirements.

10. The method of claim 9, wherein identifying a plurality of print shops comprises:
    selecting, by a user, the plurality of print shops to consolidate.

11. The method of claim 9, wherein identifying an inventory policy comprises:

selecting, by a user, one of a fixed lead time policy, a variable lead time policy and a period review policy as the inventory policy.

12. The method of claim 9, wherein receiving corresponding job demand information comprises:
   receiving, from a user, one or more job demand values, wherein each job demand value comprises a print volume per day.

13. The method of claim 9, wherein receiving corresponding job demand information comprises:
   querying one or more resources in the identified plurality of print shops; and
   receiving, from the one or more resources, one or more job demand values, wherein each job demand value comprises a print volume per day.

14. The method of claim 9, wherein determining a plurality of total inventory requirements comprises:
   for each identified print shop, using the corresponding job demand information to determine an average inventory level and an order-up-to level;
   determining the total average inventory level by summing the average inventory levels associated with each identified print shop; and
   determining the total order-up-to level by summing the order-up-to levels associated with each identified print shop.

15. The method of claim 9, wherein determining a plurality of consolidated inventory requirements comprises:
   determining consolidated job demand information by summing the job demand information for each selected print shop; and
   using the identified inventory policy and the consolidated job demand information to determine the consolidated average inventory level and the consolidated order-up-to level.

16. The method of claim 9, wherein displaying one or more statistics comprises displaying one or more of the following:
   a graph of the job demand information for one or more identified print shops;
   a graph of consolidated job demand information;
   an average inventory level for one or more of the identified print shops;
   an order-up-to level for one or more of the identified print shops;
   the total average inventory level;
   the total order-up-to level;
   the consolidated average inventory level;
   the consolidated order-up-to level; and
   an inventory reduction percentage representing a change in an inventory level due to consolidating the identified print shops.

17. A method of evaluating an impact of consolidating a plurality of print shops on inventory levels, the method comprising:
   identifying, by a processing device operably connected to a processor-readable storage medium containing one or more programming instructions for causing the processor to perform a plurality of functions, a plurality of print shop combinations to consolidate into a consolidated print shop, wherein the consolidated print shop is a unified print shop that is capable of processing all print jobs received by the one or more identified print shop combinations and each print shop combination comprises a plurality of print shops and each of the plurality of print shops is a unique document production entity;
   identifying, by the processing device, an inventory policy for each identified print shop;
   for each identified print shop combination, receiving, by the processing device, job demand information from print shops associated with the identified print shop combination;
   determining, by the processing device, a plurality of total inventory requirements for each of the identified print shop combinations, wherein the total inventory requirements comprise a total average inventory level and a total order-up-to level;
   determining, by the processing device, a plurality of consolidated inventory requirements for one or more consolidated print shops associated with the identified print shop combinations, wherein the consolidated inventory requirements comprise a consolidated average inventory level and a consolidated order-up-to level;
   assigning, by the processing device, a rank to one or more identified print shop combinations, wherein the rank is based on a percentage by which an inventory level associated with the identified print shop combination is reduced by consolidating the print shops in the identified print shop combination; and
   providing, by the processing device, an ordered list including each of the plurality of identified print shop combinations ordered by assigned rank to a user.

18. The method of claim 17, wherein receiving job demand information comprises:
   querying one or more resources in the associated print shops; and
   receiving, from the one or more resources, one or more job demand values, wherein each job demand value comprises a print volume per day.

19. The method of claim 17, wherein determining a plurality of total inventory requirements comprises:
   for each print shop in the identified print shop combination, using the corresponding job demand information to determine an average inventory level and an order-up-to level;
   determining the total average inventory level by summing the average inventory levels associated with each print shop in the identified print shop combination; and
   determining the total order-up-to level by summing the order-up-to levels associated with each print shop in the identified print shop combination.

20. The method of claim 17, wherein determining a plurality of consolidated inventory requirements comprises:
   determining consolidated job demand information by summing the job demand information for each print shop in a first identified print shop combination of the identified print shop combinations; and
   using the identified inventory policy and the consolidated job demand information to determine the consolidated average inventory level and the consolidated order-up-to level for the first identified print shop combination.

* * * * *